(12) United States Patent
Ryu et al.

(10) Patent No.: US 9,527,156 B2
(45) Date of Patent: Dec. 27, 2016

(54) TWIN SPOT WELDING APPARATUS

(71) Applicant: Hyundai Motor Company, Seoul (KR)

(72) Inventors: Sung Phil Ryu, Seoul (KR); So Young Lee, Euiwang-si (KR)

(73) Assignee: Hyundai Motor Company, Seoul (KR)

( * ) Notice: Subject to any disclaimer, the term of this patent is extended or adjusted under 35 U.S.C. 154(b) by 387 days.

(21) Appl. No.: 14/097,071

(22) Filed: Dec. 4, 2013

(65) Prior Publication Data

US 2014/0166628 A1 Jun. 19, 2014

(30) Foreign Application Priority Data

Dec. 17, 2012 (KR) .................. 10-2012-0147785

(51) Int. Cl.
*B23K 37/02* (2006.01)
*B23K 11/31* (2006.01)
*B23K 11/11* (2006.01)

(52) U.S. Cl.
CPC ............ *B23K 11/314* (2013.01); *B23K 11/115* (2013.01); *B23K 11/312* (2013.01); *B23K 11/315* (2013.01)

(58) Field of Classification Search
CPC ... B23K 11/115; B23K 11/312; B23K 11/314; B23K 11/315
USPC ...... 219/86.7, 86.33, 87, 86.25, 116, 121.63, 219/121.6, 121.64, 121.77, 121.8, 121.83; 901/8, 10, 15, 28, 42; 228/45
See application file for complete search history.

(56) References Cited

U.S. PATENT DOCUMENTS

| | | | | |
|---|---|---|---|---|
| 2,163,863 A * | 6/1939 | Biederman | .......... | B23K 11/082 219/87 |
| 2,177,831 A * | 10/1939 | Kaunitz | ............... | B23K 11/318 219/158 |
| 5,111,019 A * | 5/1992 | Torii | .................... | B23K 11/314 219/116 |
| 8,210,418 B1 * | 7/2012 | Landoll | .............. | B23K 37/0408 228/32 |
| 2004/0134888 A1 * | 7/2004 | Garza | .................. | B23K 11/315 219/87 |

FOREIGN PATENT DOCUMENTS

| | | |
|---|---|---|
| CN | 1081408 A | 2/1994 |
| CN | 101203351 A | 6/2008 |
| CN | 102209603 A | 10/2011 |
| DE | 10 2007 063 432 A1 | 6/2009 |
| KR | 10-0687026 B1 | 2/2007 |

* cited by examiner

*Primary Examiner* — Dana Ross
*Assistant Examiner* — Ket D Dang
(74) *Attorney, Agent, or Firm* — Morgan, Lewis & Bockius LLP

(57) ABSTRACT

A twin spot welding apparatus includes a fixed welder in a fixed frame on a top of which a mounting unit of a robot arm is integrally formed, a guide plate mounted on the fixed frame, an angle control plate movably installed in the guide plate, a servo actuator mounted on the fixed frame to move the angle control plate on the guide plate, and a moving welder formed so that a slope of the moving welder may be controlled by an angle control unit on the angle control plate and formed in a moving frame so that, when the servo actuator and the angle control unit are operated, movement from the fixed welder and the slope of the moving welder are controlled so that a pitch and a slope between welding points of the fixed welder and the moving welder vary.

5 Claims, 7 Drawing Sheets

TWIN SPOT WELDING APPARATUS

CROSS-REFERENCE TO RELATED APPLICATION

The present application claims priority of Korean Patent Application Number 10-2012-0147785 filed Dec. 17, 2012, the entire contents of which application is incorporated herein for all purposes by this reference.

BACKGROUND OF INVENTION

Field of Invention

The present invention relates to a twin spot welding apparatus. More particularly, the present invention relates to a twin spot welding apparatus for changing a welding pitch and a welding slope to perform welding so that it is possible to cope with a curved and sloped shape and to rapidly perform welding in a limited space and with minimum time.

Description of Related Art

In general, during a manufacturing process of a vehicle, various structure parts such as vehicle body panels molded by press are welded to complete an integrated vehicle body, painting and rust resistance works are performed on surfaces of the parts of the completed vehicle body in a painting process, and power train system parts and suspension, steering, and brake system parts are assembled and doors, a trunk lid, and a hood are assembled in an assembly process.

In addition, when vehicle body parts such as a roof, pillars, side panels, and opening unit flanges of vehicle body doors are welded in a vehicle body assembly process, spot resistance welding is widely used for welding two vehicle body panels.

In the spot resistance welding, pressure is applied to surfaces of vehicle body panels so that the vehicle body panels are deposited by electric resistance. In general, the spot resistance welding is performed by a C-type spot welding gun installed at a leading end of an arm of a spot welding robot.

In the above-described spot welding gun, a lower electrode and an upper electrode are formed on a body of the C-type spot welding gun. The upper electrode is installed on an upper side of the gun body to be connected to a driving cylinder for proving pressure.

The spot welding gun is positioned in a welding position in accordance with a behavior of the robot in a state where the gun body is installed at the leading end of the arm of the robot through an installing frame to perform spot welding on a welded object by an operation of the driving cylinder.

Particularly, in the spot resistance welding, due to development of a new vehicle, in order to automatically and repeatedly perform welding on a new welding point by the robot to which the spot welding gun is attached, a robot operator initially moves the robot to a position of an actual material once to determine a welding position and a welding angle of the spot welding gun, to set the welding position and the welding angle in the robot, and to program the welding position and the welding angle.

On the other hand, in a spot welding process for vehicle body assembly, since welding must be continuously performed on several tens to hundreds of welding points, it takes long and a work process is very complicated so that various methods of improving productivity, efficiency, and welding quality while reducing welding time are sought for.

However, in a conventional welding system, since it is possible to attach one welding apparatus to one robot in a robot arm so that welding may be performed only once every moment when the robot arm is moved, it takes long to perform welding on a predetermined number of welding points so that productivity and efficiency are deteriorated.

In order to prevent the productivity and efficiency from being deteriorated, a plurality of robots may be installed so that the robots may simultaneously move along the welding points to perform welding. However, when the plurality of robots that are expensive, that have complicated structures, and that require complicated control processes are used, installation and maintenance costs are increased, an excessive amount of energy is used, and a space occupation ratio of the robots is increased in a mass production line.

The information disclosed in this Background section is only for enhancement of understanding of the general background of the invention and should not be taken as an acknowledgement or any form of suggestion that this information forms the prior art already known to a person skilled in the art.

BRIEF SUMMARY

Various aspects of the present invention provide for a twin spot welding apparatus for changing a welding pitch and a welding slope to perform welding so that it is possible to cope with a curved and sloped shape, to rapidly perform welding in a limited space and with minimum time, and to improve productivity, flexibility, and efficiency of a vehicle body process. Only one apparatus is applied so that it is possible to reduce the number of robots and to reduce installation cost and used energy.

Various aspects of the present invention provide for a twin spot welding apparatus, including a fixed welder formed in a fixed frame on a top of which a mounting unit mounted in a robot arm is integrally formed, a guide plate mounted on one side of the fixed frame, an angle control plate movably installed in the guide plate on a side of the fixed frame, a servo actuator mounted on the other side of the fixed frame and connected to the angle control plate to move the angle control plate on the guide plate, and a moving welder formed so that a slope of the moving welder may be controlled by an angle control unit on the angle control plate and formed in a moving frame so that, when the servo actuator and the angle control unit are operated, a movement from the fixed welder and the slope of the moving welder are controlled so that a pitch and a slope between welding points of the fixed welder and the moving welder are changed.

The angle control unit may include a rack bar formed so that a lower end is rounded downward from one end mounted on a front surface of the angle control plate and a drive motor in which a pinion gear engaged with the rack bar is mounted in a rotation shaft and that is mounted on the moving frame, for changing a slope of the moving frame on the angle control plate through the pinion gear engaged with the rack bar to be moved in accordance with a rotation.

The angle control unit may further include a first guide unit formed between the moving frame and the angle control plate to guide a movement of the angle control plate. The first guide unit may further include first guide rails installed on the angle control plate under the rack bar and first rail blocks mounted to slide along the first guide rails and connected to the moving frame.

The first guide rails may be formed so that lower ends are rounded downward from one ends mounted on the front surface of the angle control plate to correspond to the rack bar.

The angle control plate may further include a second guide unit installed to guide the movement of the angle control plate while moving on the guide plate. The second guide unit may further include second guide rails mounted in upper and lower portions of the guide plate on a front of the guide plate and second rail blocks installed to slide along the second guide rails and connected to a rear of the angle control plate.

Transformers may be installed in the fixed frame and the moving frame, respectively. The transformer mounted in the moving frame may be connected to the second rail blocks of the second guide unit and may be movably mounted on the guide plate together with the angle control plate.

The servo actuator may be formed of a roller screw actuator for converting a torque of the drive motor into a linear motion. In the servo actuator, a moving block fixed to one side of the fixed frame and formed to reciprocate from a screw shaft may be connected to one side of the angle control plate.

In the moving welder, a pressing actuator mounted in the moving frame may be connected to an upper welding gun provided in the moving welder and a welding gun moving block formed to reciprocate from a screw shaft may be connected to the upper welding gun.

In the fixed welder, the upper welding gun may be connected to the fixed frame through a driving cylinder in which an operating rod is mounted downward and the operating rod.

The methods and apparatuses of the present invention have other features and advantages which will be apparent from or are set forth in more detail in the accompanying drawings, which are incorporated herein, and the following Detailed Description, which together serve to explain certain principles of the present invention.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
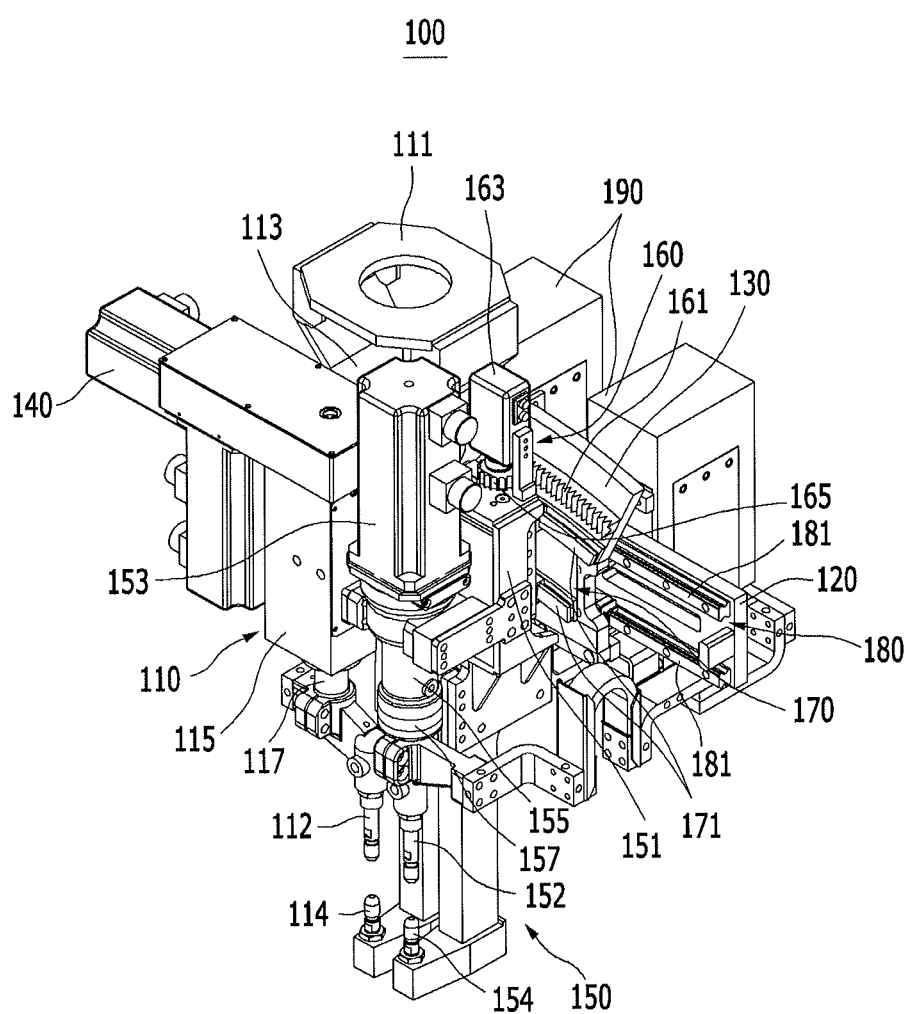
FIG. 1 is a perspective view of an exemplary twin spot welding apparatus according to the present invention.
Figure 2:
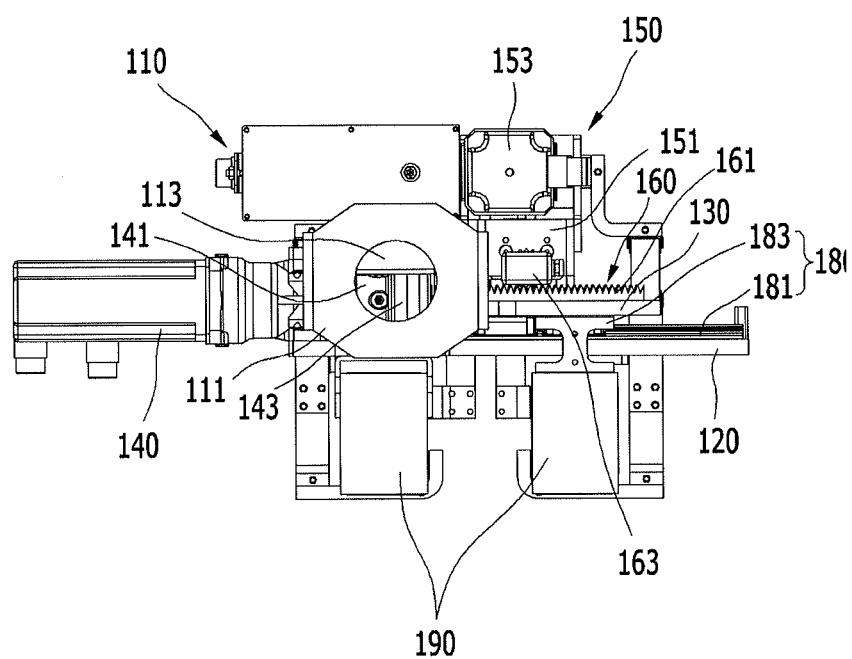
FIG. 2 is a top plan view of an exemplary twin spot welding apparatus according to the present invention.
Figure 3:
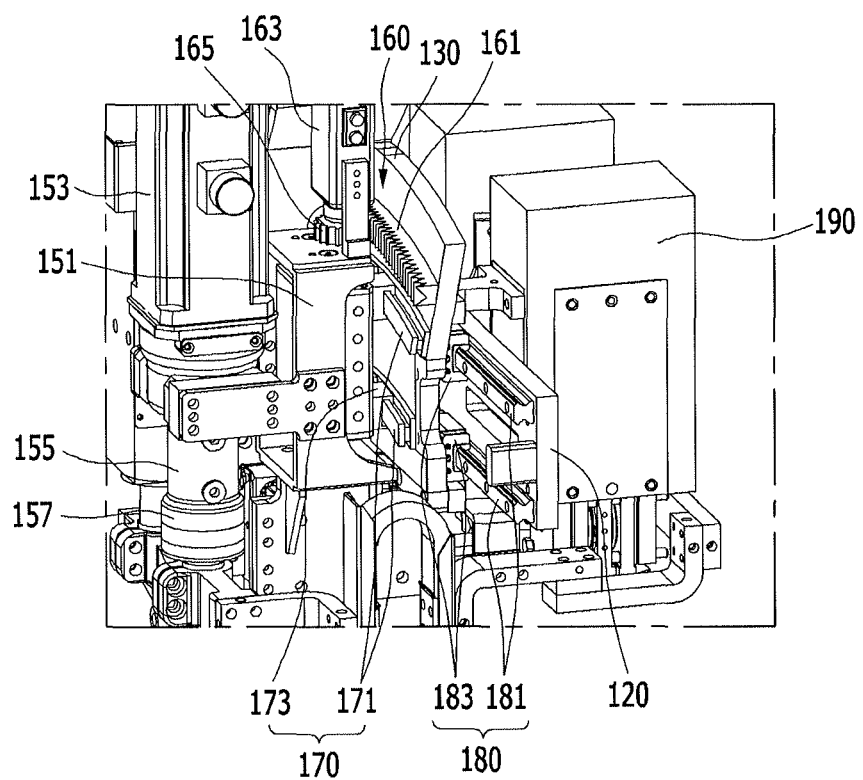
FIG. 3 is an enlarged perspective detail view of part of the twin spot welding apparatus of FIG. 1.
Figure 4:
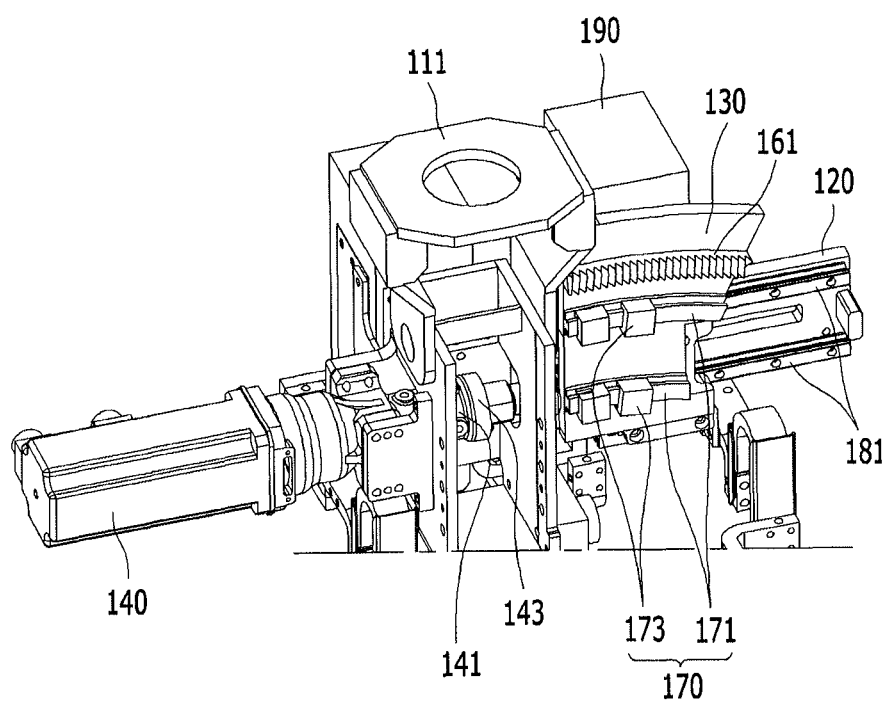
FIG. 4 is an enlarged view of exemplary main parts including an angle control plate and a servo actuator in a twin spot welding apparatus according to the present invention.
Figure 5:
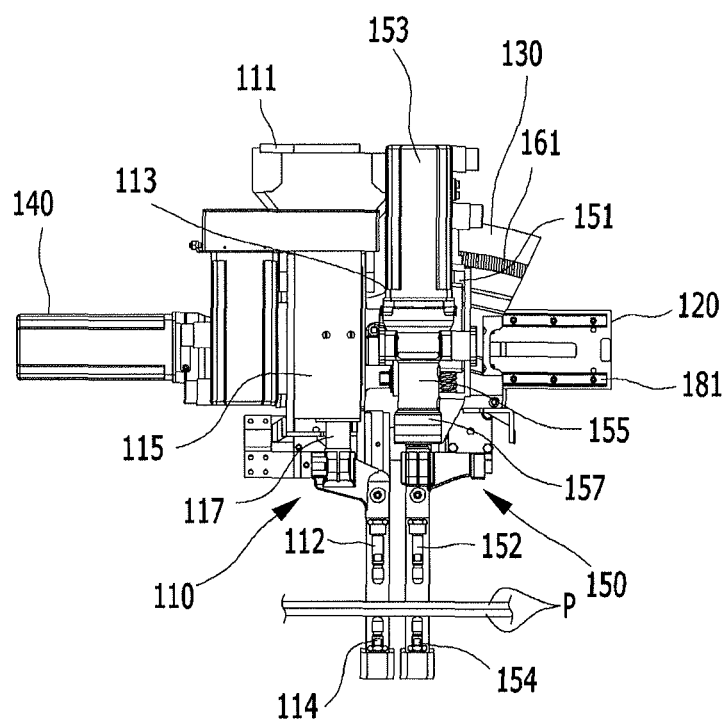
FIGS. 5, 6 and 7 are views illustrating operation states of an exemplary twin spot apparatus according to the present invention in stages.
Figure 6:
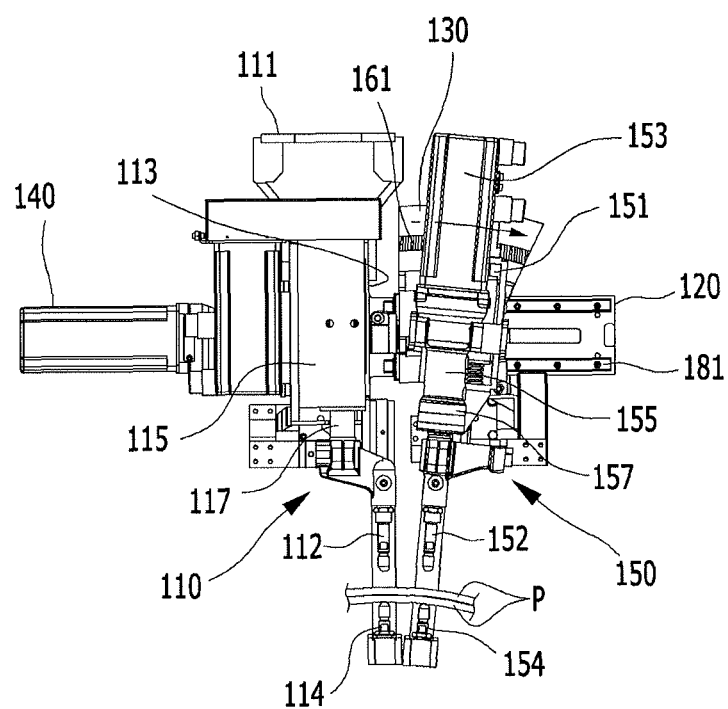

FIG. 1 is a perspective view of a twin spot welding apparatus according to various embodiments of the present invention. FIG. 2 is a top plan view of a twin spot welding apparatus according to various embodiments of the present invention. FIG. 3 is an enlarged detailed perspective view of a part of FIG. 1. FIG. 4 is an enlarged view of main parts including an angle control plate and a servo actuator in a twin spot welding apparatus according to various embodiments of the present invention. FIG. 5 is a perspective view of a gun aligning unit applied to a twin spot welding apparatus according to various embodiments of the present invention. FIG. 6 is a view illustrating an operation state of a gun aligning unit in a twin spot welding apparatus according to various embodiments of the present invention.

Figure 7:
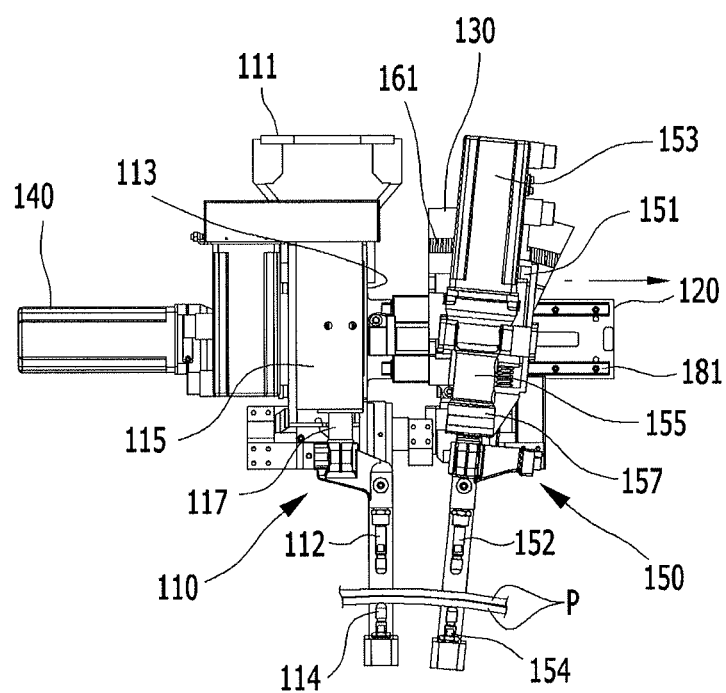

Referring to the drawings, a twin spot welding apparatus 100 according to various embodiments of the present invention changes a welding pitch and a welding slope to perform welding so that it is possible to cope with a curved and sloped shape of a panel P to be welded (see FIGS. 5-7). The twin spot welding apparatus rapidly performs welding in a limited space and with minimum time so that it is possible to improve productivity, flexibility, and efficiency of a vehicle body process. Only one apparatus is applied so that it is possible to reduce the number of robots and to reduce installation cost and used energy.

For this purpose, the twin spot welding apparatus 100 according to various embodiments of the present invention includes a fixed welder 110, a guide plate 120, an angle control plate 130, a servo actuator 140, and a moving welder 150 as illustrated in FIGS. 1-3.

First, the fixed welder 110 is formed in a fixed frame 113 on a top of which a mounting unit 111 mounted in a robot arm is integrally formed. One will appreciate that these integral components may be monolithically formed.

The guide plate 120 is mounted on one side of the fixed frame 113 to be perpendicular to the fixed frame 113.

In various embodiments, the angle control plate 130 is movably installed in the guide plate 120 on a side of the fixed frame 113.

The servo actuator 140 is mounted in the other side of the fixed frame 113 and is connected to the angle control plate 130 to move the angle control plate 130 on the guide plate 120.

Here, the servo actuator 140 may be formed of a roller screw actuator for converting a torque of a drive motor into a linear motion.

In the servo actuator 140, a moving block 143 having a main body fixed to one side of the fixed frame 113 and formed to reciprocate from a screw shaft 141 may be connected to one side of the angle control plate 130.

On the other hand, the roller screw actuator has a structure in which the screw shaft 141 directly connected to a drive shaft of the drive motor is rotated by a motor driving torque so that the nut type moving block 143 engaged with a screw thread of the screw shaft 141 moves back and forth. Since the structure of the roller screw actuator that may be used as the servo actuator 140 is an industrially widely used well-known structure, detailed description thereof will be omitted.

That is, when the servo actuator 140 is operated, the moving block 143 moves toward or away from the screw shaft 141 to move the angle control plate 130 on the guide plate 120.

The moving welder 150 is formed so that a slope of the moving welder 150 may be controlled by an angle control unit 160 on the angle control plate 130.

The moving welder 150 is formed in a moving frame 151 so that, when the servo actuator 140 and the angle control unit 160 are operated, a movement from the fixed welder 110 and the slope of the moving welder 150 are controlled so that a pitch and a slope between welding points of the fixed welder 110 and the moving welder 150 are changed.

In various embodiments, the angle control unit 160 includes a rack bar 161 and a drive motor 163 as illustrated in FIGS. 3 and 4.

First, the rack bar 161 is formed so that a lower end is rounded downward from one end mounted on a front surface of the angle control plate 130.

The drive motor 163 is mounted on the moving frame 130 while a pinion gear 165 engaged with the rack bar 161 is mounted in a rotation shaft.

The drive motor 163 changes a slope of the moving frame 151 on the angle control plate 130 through the pinion gear 165 engaged with the rack bar 161 to be moved along the rack bar 161 in accordance with a rotation of the rotation shaft.

Here, the angle control unit 160 further includes a first guide unit 170 formed between the moving frame 151 and the angle control plate 130 in order to guide a movement of the angle control plate 130.

The first guide unit 170 includes first guide rails 171 installed on the angle control plate 130 under the rack bar 161 and first rail blocks 173 mounted to slide along the first guide rails 171 and connected to the moving frame 151.

The above-described first guide unit 170 includes the pair of first guide rails 171 formed under the rack bar 161 and formed to be rounded like the rack bar 161.

Therefore, when the pinion gear 165 is moved along the rack bar 161 by an operation of the drive motor 163 of the angle control unit 160, the first rail blocks 173 stably slide along the first guide rails 171 so that the slope of the moving frame 151 is changed.

On the other hand, in various embodiments, the angle control plate 130 further includes a second guide unit 180 installed to guide the movement of the angle control plate 130 when angle control plate 130 is moved on the guide plate 120.

The second guide unit 180 includes second guide rails 181 mounted in upper and lower portions of the guide plate 120 on a front of the guide plate 120 and second rail blocks 183 installed to slide along the second guide rails 181 and connected to a rear of the angle control plate 130.

When the angle control plate 130 is moved by an operation of the servo actuator 140, the second rail blocks 183 connected to the angle control plate 130 stably slide along the second guide rails 181 so that the second guide unit 180 stably supports and guides the slide of the angle control plate 130.

In various embodiments, transformers 190 for converting primary high voltage/low current into secondary low voltage/high current are installed in the fixed welder 110 of the fixed frame 113 and the moving welder 150 of the moving frame 151.

In the transformers 190, the transformer 190 mounted in the moving frame 151 is connected to the moving frame 151 in the rear of the guide plate 120 through the second rail blocks 183 of the second guide unit 180.

Therefore, the transformer 190 formed in the moving welder 150 may be movably mounted on the guide plate 120 together with the angle control plate 130.

In various embodiments, in the movable welder 150, a pressing actuator 153 mounted in the moving frame 151 is connected to an upper welding gun 152 of the moving welder and a welding gun moving block 157 formed to reciprocate in a screw shaft 155 may be connected to the upper welding gun 152.

Here, the roller screw actuator for converting the torque of the drive motor into the linear motion may be used as the pressing actuator 153 for generating welding pressure like the above-described servo actuator 140.

When the pressing actuator 153 is operated, the welding gun moving block 157 is moved toward or away from the screw shaft 155 to move the upper welding gun 152 of the moving welder 150 toward a lower welding gun 154.

Therefore, the upper and lower welding guns 152 and 154 flow current while pressing the welding points of the panel P with the panel P to be welded interposed to perform welding.

In the fixed welder 110, the upper welding gun 112 may be connected to the fixed frame 113 through a driving cylinder 115 in which an operating rod 117 is mounted downward and the operating rod 117.

In the fixed welder 110, when the operating rod 117 of the driving cylinder 115 moves forward, the upper welding gun 112 of the fixed welder 110 is moved toward the lower welding gun 114 and flows current while pressing the welding points of the panel P by the upper and lower welding guns 112 and 114 to perform welding like the above-described pressing actuator 155.

Hereinafter, an operation of the twin spot welding apparatus according to various embodiments of the present invention having the above structure will be described in detail.

FIGS. 5 to 7 are views illustrating operation states of a twin spot welding apparatus according to various embodiments of the present invention in stages.

First, when the panel P to be welded is horizontal, as illustrated in FIG. 5, the twin spot welding apparatus 100 performs welding in a state where the moving welding gun 150 is disposed in an initial position where the moving welding gun 150 is close to the fixed welder 110 in accordance with a pitch between the welding points.

Here, when the pitch between the welding points is increased, the moving welder 150 is moved by the operation of the servo actuator 140 from the fixed welder 110 along the guide plate 120 on a side to correspond to the pitch between the welding points.

In such a state, the fixed welder 110 and the moving welder 150 receive current from the transformers 190 in a state where the upper welding guns 112 and 152 are moved toward the lower welding guns 114 and 154 by operations of the pressing actuator 153 and the driving cylinder 115 to press the panel P so that welding is performed.

In various embodiments, when the panel P to be welded is curved, as illustrated in FIG. 6, the twin spot welding apparatus 100 changes the slope of the moving welder 150 on the angle control plate 130 by an operation of the angle control unit 160 to correspond to the shape of the panel P.

That is, as the pinion gear 165 rotated while being engaged with the rack bar 161 by the operation of the drive motor 163 is moved along the rack bar 161 on the angle control plate 130, an upper end of the moving frame 151 is sloped toward a side along the rack bar 161 so that the slope of the moving welder 150 is changed.

Therefore, the moving welder 150 maintains a state in which the upper and lower welding guns 152 and 154 are sloped at a predetermined angle based on the fixed welder 110 to correspond to the curved panel P.

In such a state, the fixed welder 110 and the moving welder 150 receive current from the transformers 190 in a state where the upper welding guns 112 and 152 are moved toward the lower welding guns 114 and 154 by operations of the pressing actuator 153 and the driving cylinder 115 to press the welding points of the curved panel P so that welding is performed.

On the other hand, when the curved panel P is welded as described above, in a case where the pitch between the welding points is increased, as illustrated in FIG. 7, the moving welder 150 sloped at a predetermined angle by the operation of the servo actuator 140 is moved on the guide plate 120 so that the moving welder 150 is moved from the fixed welder 110.

Therefore, the moving welder 150 is moved based on the fixed welder 110 in a state of being sloped at a predetermined angle to correspond to the shape of the panel P so that, although the pitch between the welding points is changed, it is possible to cope with the change in the pitch in real time.

That is, the twin spot welding apparatus 100 according to various embodiments of the present invention may simultaneously weld two points and may perform welding while coping with the pitch between the welding points of the panel P and the curved or sloped shape of the panel in real time so that the twin spot welding apparatus 100 rapidly perform welding in a limited space and with minimum time.

Therefore, when the above-described twin spot welding apparatus 100 according to various embodiments of the present invention is applied, the two welders 110 and 150 that independently perform spot welding are formed so that a welding pitch and a welding slope may be controlled based on one welder. Therefore, it is possible to cope with positions of welding points and a curved and sloped shape and to rapidly perform welding in a limited space and with minimum time.

In addition, in comparison with the conventional art, welding may be performed no less than two times by one apparatus so that it is possible to improve productivity, flexibility, and efficiency of a vehicle body process. Only one apparatus is applied so that it is possible to reduce the number of robots and to reduce installation cost and used energy.

In addition, the welding pitch and the welding slope may be controlled in real time to correspond to the positions of the welding points and the shape of the panel so that it is possible to continuously and efficiently perform welding without stopping driving of the apparatus in order to set the apparatus in accordance with the control of the welding pitch and slope.

For convenience in explanation and accurate definition in the appended claims, the terms upper or lower, front or rear, inside or outside, and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A twin spot welding apparatus, comprising:
   a fixed welder mounted to a fixed frame, the fixed frame being integrally formed with mounting unit for a robot arm on a top thereof;
   a guide plate mounted to one side of the fixed frame;
   an angle control plate movably mounted to the guide plate to the one side of the fixed frame and configured to control a slope of a moving welder;
   a servo actuator mounted to an opposing side of the fixed frame and connected to the angle control plate to move the angle control plate on the guide plate; and
   the moving welder configured so that a slope of the moving welder is controlled by an angle control unit on the angle control plate and mounted to a moving frame so that, when the servo actuator and the angle control unit are operated, a movement from the fixed welder and the slope of the moving welder are controlled so that a pitch and a slope between welding points of the fixed welder and the moving welder are changed,
   wherein the angle control unit comprises:
      a rack bar formed so that a lower end is rounded downward from one end mounted on a front surface of the angle control plate; and
      a drive motor in which a pinion gear engaged with the rack bar is mounted in a rotation shaft and that is mounted on the moving frame, for changing the slope of the moving frame on the angle control plate through the pinion gear engaged with the rack bar to be moved in accordance with a rotation,
   wherein the angle control unit further comprises a first guide unit formed between the moving frame and the angle control plate to guide a movement of the angle control plate, and wherein the first guide unit further comprises:
      first guide rails installed on the angle control plate under the rack bar; and
      first rail blocks mounted to slide along the first guide rails and connected to the moving frame for changing the slope of the moving frame of the moving welder,
   wherein the first guide rails are formed so that lower ends are rounded downward from one ends mounted on the front surface of the angle control plate to correspond to the rack bar, and
   wherein the angle control plate further comprises a second guide unit installed to guide the movement of the angle control plate while moving on the guide plate, and wherein the second guide unit further comprises:
      second guide rails mounted in upper and lower portions of the guide plate on a front of the guide plate; and
      second rail blocks installed to slide along the second guide rails and connected to a rear of the angle control plate.

2. The twin spot welding apparatus of claim 1, wherein transformers are installed in the fixed frame and the moving frame, respectively, and wherein the transformer mounted in the moving frame is connected to the second rail blocks of the second guide unit and is movably mounted on the guide plate together with the angle control plate.

3. The twin spot welding apparatus of claim 1, wherein the servo actuator is includes a roller screw actuator for converting a torque of the drive motor into a linear motion, and wherein, in the servo actuator, a moving block fixed to the one side of the fixed frame and formed to reciprocate from a screw shaft is connected to one side of the angle control plate.

4. The twin spot welding apparatus of claim 1, wherein the moving welder includes a pressing actuator mounted in the moving frame is connected to an upper welding gun provided in the moving welder and a welding gun moving block formed to reciprocate from a screw shaft is connected to the upper welding gun.

5. The twin spot welding apparatus of claim 1, wherein the fixed welder includes an upper welding gun is connected to the fixed frame through a driving cylinder in which an operating rod is mounted downward and the operating rod.

\* \* \* \* \*